United States Patent
Glover et al.

(10) Patent No.: US 11,708,508 B2
(45) Date of Patent: Jul. 25, 2023

(54) HIGH PERFORMANCE TACK COAT

(71) Applicant: Russel Standard Corp., Pittsburgh, PA (US)

(72) Inventors: Ionela Glover, Greenville, PA (US); Brian Cancio, Grove City, PA (US)

(73) Assignee: Russell Standard Corp., Pittsburgh, PA (US)

( * ) Notice: Subject to any disclaimer, the term of this patent is extended or adjusted under 35 U.S.C. 154(b) by 462 days.

(21) Appl. No.: 16/819,980

(22) Filed: Mar. 16, 2020

(65) Prior Publication Data

US 2020/0291266 A1 Sep. 17, 2020

Related U.S. Application Data

(60) Provisional application No. 62/819,100, filed on Mar. 15, 2019.

(51) Int. Cl.
  *C09D 195/00* (2006.01)
  *C09D 5/02* (2006.01)
  *C09D 7/45* (2018.01)

(52) U.S. Cl.
  CPC ......... *C09D 195/005* (2013.01); *C09D 5/024* (2013.01); *C09D 7/45* (2018.01)

(58) Field of Classification Search
  CPC ....... C09D 195/005; C09D 5/024; C09D 7/45
  USPC ........................................ 106/277
  See application file for complete search history.

(56) References Cited

U.S. PATENT DOCUMENTS

| | | | |
|---|---|---|---|
| 3,871,893 A | 3/1975 | Doughty | |
| 4,198,177 A | 4/1980 | Ray, Jr. et al. | |
| 4,762,565 A | 8/1988 | Graf | |
| 5,296,264 A | 3/1994 | Blacklidge et al. | |
| 5,503,871 A | 4/1996 | Blacklidge et al. | |
| 5,735,634 A | 4/1998 | Ulrich et al. | |
| 5,769,567 A | 6/1998 | Durand et al. | |
| 5,957,619 A | 9/1999 | Kinoshita et al. | |
| 6,158,920 A | 12/2000 | Malot | |
| 6,194,472 B1 | 2/2001 | Logaraj et al. | |
| 6,679,941 B2 | 1/2004 | Van Der Horst et al. | |
| 6,764,542 B1 | 7/2004 | Lackey et al. | |
| 7,104,724 B2 | 9/2006 | Terry | |
| 7,275,890 B2 | 10/2007 | Thomas et al. | |
| 7,279,035 B2 | 10/2007 | Bamat | |
| 7,503,724 B2 | 3/2009 | Blacklidge | |
| 7,687,104 B2 | 3/2010 | Moon et al. | |
| 7,918,624 B2 | 4/2011 | Blacklidge | |
| 8,444,760 B2 | 5/2013 | Crews et al. | |
| 2004/0240939 A1 | 12/2004 | Hays et al. | |
| 2005/0183633 A1 | 8/2005 | Perdomo et al. | |
| 2008/0069638 A1 | 3/2008 | Crews et al. | |
| 2015/0110556 A1* | 4/2015 | Kadrmas | E01C 3/00 524/60 |
| 2017/0107376 A1* | 4/2017 | Winship | C08L 95/005 |

FOREIGN PATENT DOCUMENTS

| | | | |
|---|---|---|---|
| CN | 105924988 | * | 9/2016 |
| CN | 109370513 | * | 2/2019 |
| EP | 0859030 A1 | | 8/1998 |
| EP | 1275698 A1 | | 1/2003 |
| EP | 1482012 A1 | | 12/2004 |

OTHER PUBLICATIONS

Translation of CN 109370513, Feb. 22, 2019. (Year: 2019).*
Translation of CN 105924988, Sep. 7, 2016. (Year: 2016).*
Bardesi et al., "A Novel Generation of Tack Coat Emulsions to Avoid Adhesion to Tyres." Paper 4F-086, Proc., 3rd World Congress on Emulsions, Lyon, France, 2002.
Durand et al., "From the laboratory to the work site: an innovative spreading test bench for bitumen emulsions", Abstract from the 2nd Eurasphalt and Eurobitume Congress, Sep. 2000, Barcelona, Spain.
Mohammad, "Laboratory Evaluation of Asphalt Tack Coat Materials," SEAUPG 2004 Conference, Baton Rouge, 2004.
Recasens et al., "Assessing heat-adhesive emulsions for tack coats," Proceedings of the Institution of Civil Engineers Transport, 2005, pp. 45-51, vol. 158.
United States Department of Transportation,"Guidelines for Using Prime and Tack Coats," Publication No. FHWA-CFL/FD-05-002, 2005, pp. 1-111.

* cited by examiner

*Primary Examiner* — Hui H Chin
(74) *Attorney, Agent, or Firm* — The Webb Law Firm

(57) ABSTRACT

A tack coat includes a first phase and a second phase. The first phase includes asphalt, and the second phase includes an emulsifier and a rheology modifier. Optionally, the second phase also includes a material insoluble in the water. The pH of the second phase can be between 1-3, 6-8, or 9-13.

16 Claims, No Drawings

HIGH PERFORMANCE TACK COAT

CROSS REFERENCE TO RELATED APPLICATIONS

This application claims priority to U.S. Provisional Application No. 62/819,100 filed Mar. 15, 2019, which is incorporated herein by reference in its entirety.

BACKGROUND OF THE INVENTION

Field of the Invention

The present disclosure relates generally to materials for use in paving and road construction. In some non-limiting examples, the present disclosure relates to a fast curing track coat, which can be used for trackless tack, tack, pavement sealer, fog sealer, chip sealer, and metal and concrete sealer.

Description of Related Art

In the construction of new roads, it is often necessary to prepare a base layer, followed by subsequent provision of successive layers of whatever material is selected for the road, which shall be referred to as paving material. In addition, during the repair of roads, layers of cracked, damaged, or otherwise inadequate paving material are removed through grinding or stripping, leaving an exposed underlying layer. As with the construction of new roads, subsequent layers of paving material are then provided to the underlying base layer of a repaired road.

In either of the above situations, it is desirable to provide adequate adhesion between the layers of paving material, to reduce slipping and cracking of layers during the life of the road. Inadequate adhesion between layers of paving material can result in cracking, deterioration, and, ultimately, failure of a road. Such results can be dangerous for vehicles passing over such a road. Moreover, such road failures require repairs, resulting in a need to spend additional time and money, a need to detour traffic, and decreased productivity and quality of life for residents of the area of concern.

Adhesives for bonding layers of paving material together are known in the art, and have differing characteristics in terms of composition and ultimate physical properties. Typically, these adhesives are known as tack coats.

SUMMARY OF THE INVENTION

The invention is directed to a tack coat. The tack coat comprises a first phase and a second phase. The first phase comprises asphalt. The second phase comprises an emulsifier and a rheology modifier. Optionally the second phase comprises a material insoluble in the water. The pH of the second phase can be between 1-3, 6-8, or 9-13.

In one embodiment, the tack coat comprises a first phase and a second phase. The first phase comprises asphalt. The second phase comprises an emulsifier, a rheological modifier and a material insoluble in the water. The second phase has a pH between 1 and 3. The pH of the second phase is adjusted by adding an acid.

In another embodiment, the tack coat comprises a first phase and a second phase. The first phase comprises asphalt. The second phase comprises an emulsifier, a rheological modifier, and a material insoluble in the water. The second phase has a pH between 9 and 13. The pH of the second phase is adjusted by adding a base.

In another embodiment, the tack coat comprises a first phase and a second phase. The first phase comprises asphalt. The second phase comprises an emulsifier and a rheological modifier in the water. The second phase has a pH between 6 and 8. The pH of the second phase is not adjusted by the addition of any acid or base.

In another embodiment, the tack coat comprises a first phase and a second phase. The first phase comprises asphalt. The second phase comprises an emulsifier, a rheological modifier and a material insoluble in the water. The second phase has a pH between 6 and 8. The pH of the second phase is not adjusted by the addition of any acid or base.

DETAILED DESCRIPTION OF THE INVENTION

The following description is merely exemplary in nature and is in no way intended to limit the invention, its application, or uses. While the description is designed to permit one of ordinary skill in the art to make and use the invention, and specific examples are provided to that end, they should in no way be considered limiting. It will be apparent to one of ordinary skill in the art that various modifications to the following will fall within the scope of the appended claims. The present invention should not be considered limited to the presently disclosed embodiments, whether provided in the examples or elsewhere herein.

As used herein, the term asphalt refers to any asphaltic-based paving material that can be utilized to construct roads. Such materials include asphalt, asphalt binders, asphalt cements, asphalt-based cements, asphalt concrete, cut-back asphalts, emulsified asphalts, modified asphalt, bituminous material, bitumen) and the like. One of ordinary skill in the art will understand that the tack coat disclosed may be used as an adhesive to bond together layers of any asphaltic material.

Asphalt has various physical and chemical properties, including penetration, viscosity, and molecular weight. Penetration refers to the depth into a section of asphaltic material that a needle with a 100 g weight thereon will penetrate when applied to the material for 5 seconds at an ambient temperature of 25 degrees Celsius (77 degrees Fahrenheit). The penetration is measured in tenths of a millimeter (dmm). Thus, an asphalt having a penetration rating of 50 dmm is one in which a 100 g weight penetrates the material to a depth of 5 mm after 5 seconds at an ambient temperature of 25 degrees Celsius. Penetration may be tested according to the AASHTO T-49 standard, developed by the American Society for Testing and Materials, and promulgated by the American Association of State Highway and Transportation Officials.

Viscosity refers to resistance to flow as measured using a rotational viscometer with a spindle selected to record an accurate measurement in centipoise at 135 degrees Celsius (275 degrees Fahrenheit) and 165 degrees Celsius (329 degrees Fahrenheit). Thus, an asphalt having a viscosity of 340 cP @ 135 degrees Celsius (275 degrees Fahrenheit) produces a viscosity value as measured by the mechanical bearing of a rotational viscometer with a spindle selected to be in range of the value of 340 cP. Asphalt viscosity may be tested according to the AASHTO T-316 standard, developed by the American Society for Testing and Materials, and promulgated by the American Association of State Highway and Transportation Officials.

Molecular weight, the mass of a molecule, is defined by their size in daltons (Da) or kilodaltons (kDa)(1 Da=1 g/mol.). Asphaltic molecules are sensitive to hydrodynamic test methods, for example Gel Permeation Chromatography (GPC). Based on GPC data, certain ranges of molecular weights are defined as low molecular weight (LMW), medium molecular weight (MMW) and high molecular weight (HMW). Larger molecular weight species travel a short distance, while smaller molecular weight species travel further down the column, generating a distribution of size and frequency of all molecular species as a curve.

The term tack coat refers to an emulsion including asphalt, an emulsifier, and water. Other additives may be added to the emulsion during, before, or after milling that is utilized between layers of a paving material to adhere the layers of paving material together. The tack coat according to the present invention can be used as a trackless tack, low-tracking tack, tack, pavement sealer, fog sealer, metal and concrete sealer, or prime coat.

As used herein, a fog sealer is a layer of an emulsion applied to a pavement surface that is used to maintain, restore, or rejuvenate a surface (e.g., a road) formed of a paving material. A tack application, a low-tracking tack application, a trackless tack application, and a pavement sealer application will be understood uses by ones skilled in the art. As used herein, a metal sealer is a layer of emulsion applied to a metal surface to maintain and protect a surface formed of metals such as iron or steel. As used herein, a concrete sealer is a layer of emulsion applied to a concrete surface to maintain and protect a surface made of Cementous materials formed from a mixture of materials such as aggregates, cements, and fine sand.

The use of numerical values in the various ranges specified in this application, unless expressly indicated otherwise, are stated as approximations as though the minimum and maximum values within the stated ranges are both preceded by the word "about". In this manner, slight variations above and below the stated ranges can be used to achieve substantially the same results as values within the ranges. Also, unless indicated otherwise, the disclosure of these ranges is intended as a continuous range including every value between the minimum and maximum values. For definitions provided herein, the definitions refer to word forms, cognates and grammatical variants of those words or phrases.

The terms "a" and "an" are intended to refer to one or more.

The present disclosure relates to a tack coat including a first phase and a second phase. The tack coat may be produced from mixing the first phase with the second phase.

The first phase may include asphalt.

The second phase may include water, a rheology modifier, an emulsifier, and optionally a material insoluble in the water of the second phase (hereinafter "insoluble material"). If the second phase includes a material insoluble in water, it is an emulsion phase. If the second phase does not include the material insoluble in water, it is a water phase.

As used herein, "rheology modifier" refers to a material that alters the rheology of a fluid composition (e.g., a liquid or emulsion) to which it is added. The second phase may include a rheology modifier. The rheology modifier may be a thickener (e.g., a material that increases the viscosity of the fluid composition to which it is added). The rheology modifier may be selected from at least one of the following non-limiting examples: water-soluble cellulose backbone and ether containing substituents, methyl cellulose (MC), sodium carboxymethyl cellulose (CMC), hydroxypropyl cellulose (HPC), ethyl hydroxyethyl cellulose (EHEC), hydroxyethyl cellulose (HEC), methyl hydroxypropyl cellulose and methyl ethyl hydroxyethyl cellulose (MEHEC). Non-limiting commercial examples of such rheology modifiers include, but are not limited to: Klucel® [Aqualon]; Glutolin [Kalle]; CMC7HC [Hercules]; Methocel A [Dow]; Cellosize® [Union Carbide], and Bermocoll [Nouryon]. The rheology modifier may be an inverse emulsion thickener, such as Texipol®. Mixtures of any of the above rheology modifiers may be used.

The second phase may include an emulsifier. The emulsifier may be selected depending on whether the second phase is to be cationic (e.g., a cationic emulsion), anionic (e.g., an anionic emulsion), or isoelectric (e.g., an isoelectric emulsion).

The emulsifier used in a cationic emulsion may include a zwitterionic emulsifier(s) which is suitable to make stable cationic emulsions of asphalt containing a large fraction of medium and high molecular weight (HMW, MMW) species (higher than 5 kiloDaltons (KDa) determined by gel permeation chromatography in THF). Examples of such emulsifiers include Redicote E-7000 and Indulin W-5.

The emulsifier used in an anionic emulsion may include a zwitterionic emulsifier(s) which is suitable to make stable anionic emulsions of asphalt containing a large fraction of MMW species (MMW range from 45 to 5 kilodaltons). Examples of such emulsifiers include Redicote E-7000 and Indulin W-5.

The emulsifier used in an isoelectric emulsion may include a zwitterionic emulsifier(s) which is suitable to make stable isoelectric emulsions of asphalt containing a large fraction of HMW and MMW species (higher than 5 kilodaltons) with or without modifying water phase pH. The isoelectric point (PI) of an emulsion is the pH at which the emulsion has simultaneously an anionic and cationic (neutral) charge.

Mixtures of any of the above emulsifiers may be used.

The water insoluble material (compound) may include, but is not limited to, at least one of: a petroleum distillate fraction in liquid form, a non-petroleum solvent in liquid form, petroleum naturally occurring solids products, inorganic solids products, and petroleum or non-petroleum solids compounds.

The petroleum distillate fraction in liquid form may include, for example, kerosene. The petroleum distillate fraction in liquid form may be included in cationic or isoelectric emulsions.

The non-petroleum solvents in liquid form may include, for example, Shirasol or Zemasol. The non-petroleum solvents in liquid form may be included in cationic or isoelectric emulsions.

The petroleum naturally occurring solids products may include, for example, Gilsonite. The petroleum naturally occurring solids products may be included in anionic or isoelectric emulsions.

The inorganic solids products may include, for example, kaolinite. The inorganic solids products may be included in anionic or isoelectric emulsions.

The petroleum or non-petroleum solids compounds may include, for example, PGXtend. The petroleum or non-petroleum solids compounds may be included in anionic or isoelectric emulsions.

The second phase may alternatively include a mixture of any of the above insoluble material.

The second phase may include an acid. The acid may be included in a cationic emulsion. The acid may be included in an amount such that the pH of the second phase is from 1-3. Non-limiting examples of acids include hydrochloric acid, sulfuric acid, and acetic acid. The second phase may include a base. The base may be included in an anionic emulsion. The base may be included in an amount such that the pH of the second phase is from 9-13. Non-limiting examples of acids include sodium hydroxide and potassium hydroxide.

A mixture of acid(s) or base(s) may be included in the second phase.

The second phase may have the above-described components thereof in the following ranges in Table A:

TABLE A

| Raw Material | Most Preferred Range (wt. %) | More Preferred Range (wt %) | Preferred Range (wt %) | Broad Range (wt %) |
| --- | --- | --- | --- | --- |
| Water | 94-95 | 93-95 | 90-96 | 80-97 |
| Thickener | 0.2-0.3 | 0.2-0.4 | 0.1-0.4 | 0.1-0.5 |
| Emulsifier | 4-5 | 4.5-5.5 | 3-6 | 1-10 |
| Water Insoluble compound | 0.02-2.0 | 0.02-2.0 | 0.02-2.0 | 0.02-2.0 |
| Acid or Base (Optional) | 0.7-.9 | 0.6-1.0 | 0.5-1.0 | 0.25-1.25 |

The second phase may be acidic, such as having a pH from 1-3. The second phase may be basic, such as having a pH from 9-13. The second phase may be neutral or isoelectric, such as having a pH from 6-8.

The tack coat may be formed from a mixture of the above-described first phase and second phase and may have the above-described phases thereof in the following ranges shown in Table B.

TABLE B

| Phase | Most Preferred Range (wt %) | More Preferred Range (wt %) | Preferred Range (wt %) | Broad Range (wt %) |
| --- | --- | --- | --- | --- |
| Emulsion Phase (Second Phase) | 48-52 | 45-50 | 45-55 | 40-60 |
| Asphalt Phase (First Phase) | 48-52 | 50-55 | 45-55 | 40-60 |

That tack coat may, when applied to a surface and cured, exhibit a pen rating per DOT agencies requirements typical from 10-90 dmm and optimized by the producer to a value where the cured tack coat material exhibits a tracking index (TI=feet tracking/application length) is close to zero. In a non-limiting embodiment, the tack coat is non-tracking or low-tracking.

The present disclosure also relates to a tack coat including a first phase, including asphalt, and a second phase, with the second phase including water, a rheology modifier, and an emulsifier. The second phase may optionally include an acid and/or a base, or the second phase may be free of an acid and/or a base. The second phase may include the insoluble material, or the second phase may be free of the insoluble material such that the second phase is a water phase. If the second phase includes an insoluble material, it would be an emulsion phase. The tack coat may be produced from mixing the first phase with the second phase.

The second phase may include an emulsifier. The emulsifier may be selected depending on whether the second phase is to be cationic (e.g., a cationic emulsion), anionic (e.g., an anionic emulsion), or isoelectric (e.g., an isoelectric emulsion). The emulsifier may have an isoelectric point between a pH of 4.5-8, such as 6-8. Using such an emulsifier in the second phase may make it such that no acid or base is required to be included in the second phase. Thus, in some non-limiting embodiments, the emulsifier may be free of acid or base. The resulting emulsion (the combination of the first and second phase) would exhibit properties of both an anionic emulsion and a cationic emulsion.

The second phase may have the above-described components thereof in the following ranges in Table C.

TABLE C

| Raw Material | Most Preferred | More Preferred | Preferred Range | Broad Range |
| --- | --- | --- | --- | --- |
| Water | 94-96 | 93-97 | 90-97 | 80-98 |
| Thickener | 0.2-0.3 | 0.2-0.4 | 0.1-0.4 | 0.1-0.5 |
| Emulsifier | 4-5 | 4.5-5.5 | 3-6 | 1-10 |
| Water Insoluble Compound (Optional) | 0.02-2 | 0.02-2 | 0.02-2 | 0.02-2 |
| Acid or Base (Optional) | 0.7-.9 | 0.6-1.0 | 0.5-1.0 | 0.25-1.25 |

The second phase may be acidic, such as having a pH from 1-3. The second phase may be basic, such as having a pH from 9-13. The second phase may be neutral or isoelectric, such as having a pH from 6-8.

The tack coat may be formed from a mixture of the above-described first phase and second phase and may have the above-described phases thereof in the following ranges shown in Table D.

TABLE D

| Phase | Most Preferred Range | More Preferred Range | Preferred Range | Broad Range |
| --- | --- | --- | --- | --- |
| Water or Emulsion Phase (Second Phase) | 48-52 | 45-50 | 45-55 | 40-60 |
| Asphalt Phase (First Phase) | 48-52 | 50-55 | 45-55 | 40-60 |

That tack coat may, when applied to a surface and cured, exhibit a pen rating from 10-60. In a non-limiting embodiment, the tack coat is non-tracking.

In any of the above-described tack coats, the first phase and the second phase may be stored in separate tanks prior to mixing to form the tack coat.

The tack coat formed from the above-identified materials in the above-identified manner may be utilized as an adhesive for bonding together layers of paving material. For example, a base layer may be provided, and a layer of non-tracking tack coat may be applied to that base layer through known means, for example and without limitation a distributor or pressurized sprayer, and allowed to dry or cure. The tack coat may be applied at any suitable rate or amount. The tack coat may be applied at between 0.04 and 0.18 gallons of emulsion per square yard (gpy2). The tack coat may be applied at between 0.04 and 0.08 gpy2. The tack coat may be applied at 0.05 gpy2. Those of ordinary skill will understand that a lesser amount of tack coat can be applied when the tack coat is applied to fresh asphalt, and a greater amount can be applied for milled surfaces.

When it is applied, the tack coat may be heated to a temperature suitable for even application of the composition. In non-limiting embodiments, the tack coat may be from 100-200 degrees Fahrenheit when it is applied, such as from 140-180 degrees Fahrenheit. Drying or curing may occur for 10-60 minutes, such as 15-30 minutes, depending on the environmental conditions (temperature, direct light/ sun, humidity, air flow), application rate, application temperature, and the like. The makeup of the tack coat may affect drying or curing time.

Once the tack coat is applied to the base layer and allowed to dry or cure, another layer of paving material may be provided on top of the tack coat layer. As provided above, the tack may be permitted to cure. The tack coat may provide bonding in cold paving, as well as with warm and hot-mix asphalts. In non-limiting embodiments, hot-mix asphalt may be applied to the tack coat once the tack coat has cured. In such embodiments, the hot-mix asphalt may be at a temperature from 250-350 degrees Fahrenheit when it is applied. The heat from the newly added paving material may re-liquefy the tack coat to permit a bond to be formed between the base layer and the newly added layer of paving material. This process, provision of a tack coat on top of the paving material, drying/curing of the tack coat, and provision of a hot layer of paving material on top of the tack coat may be repeated as many times as necessary to provide a complete, paved surface.

In non-limiting embodiments, a fog seal, used for repairing and rejuvenating a surface, may be applied thereon. The tack coat described above may be further diluted to produce the fog seal adding up to 20% water, resulting in a composition having an asphalt residue percentage of approximately 40%. The fog seal may be applied to a surface that is in need of repair and remediation, or to a remediated surface. For all applications additional modifiers, such as thickeners, pigments and/or latexes, may or may not be added to improve performance. For example, when used as a fog seal, the tack coat may be diluted by water and then pigments and latexes added. In a non-limiting embodiment, these modifiers consist of thickeners such as Nouryon Bermacoll EM 7000, Nouryon Alcogum L-265, pigments such as Carbon Black, and latexes such as Ultrapave UP-1159, BASF Butanol NX-4190.

EXAMPLES

Example 1

Cationic Second Phase Emulsion A

The raw materials in Table 1 below were combined according to the process described in Table 1 to form Cationic Second Phase Emulsion A.

TABLE 1

| Raw Materials | Recommended % wt. | Range of % wt | Process |
|---|---|---|---|
| Water | 94.25 | 94-95 | Ambient temperature, any pH |
| Thickener | 0.3 | 0.2-0.4 | Start heating the mix, water, and thickener up to 120 F. while mixing until the thickener is fully dissolved in water |
| Emulsifier | 4.6 | 4.5-5.5 | Any emulsifier recommended for High molecular weight asphaltic products will be added to previous mix, while a uniform temperature is maintained. Those skilled in the art will ensure that the emulsifier sufficiently interacts with the thickener to produce the desired rheological modification. |

TABLE 1-continued

| Raw Materials | Recommended % wt. | Range of % wt | Process |
|---|---|---|---|
| Water insoluble compound | 0.02 | 0.04 to 0.5 | Add while mixing, adjust mixer speed to make an emulsion, keep temperature at 120 F. |
| Acid | 0.8 | 0.6-1.0 | Add acid to obtain pH between 1-3 |

Physical properties associated with Cationic Second Phase Emulsion A are as shown in Table 2.

TABLE 2

| Test | Procedure | Recommended values |
|---|---|---|
| pH | ASTM | 2 |
| Saybolt viscosity, sec (optional) | AASTHO T 59 | Max 100 |
| Paddle Cannon viscosity, mPa · s | AASHTO T382 | Max 200 |
| Sieve, % | AASTHO T 59 | Max 0.3 |
| Storage stability 24 h, % | AASTHO T 59 | Max 0.1 |
| % residue by evaporation | AASHTO T 59 | 2.5 |

Example 2

Cationic Tack Coat

The phases in Table 3 below were combined to form a Cationic Tack Coat.

TABLE 3

| Phase | % wt. | Temperature range F. |
|---|---|---|
| Cationic Second Phase Emulsion A | 48 | 100-120 |
| Asphalt | 52 | 300-320 |

Physical properties associated with Cationic Tack Coat are as shown in Table 4.

TABLE 4

| Property | Test Method | Recommended Ranges |
|---|---|---|
| TEST ON EMULSION | | |
| Saybolt viscosity, sec (optional) | AASTHO T 59 | Max 100 |
| Paddle Cannon viscosity, mPa · s | AASHTO T382 | Max 200 |
| Sieve, % | AASTHO T 59 | Max 0.3 |
| Storage stability 24 h, % | AASTHO T 59 | Max 0.1 |
| % residue by evaporation | ASTM D 7404 | Min 50 |
| Particle charge or ID cationic section 28 | AASHTO 59 | cationic |
| TEST ON RESIDUE | | |
| Pen on evaporation residue | AASTHO T 49 | 10-60 |

Example 3

Anionic Second Phase Emulsion A

The raw materials in Table 5 below were combined according to the process described in Table 5 to form Anionic Second Phase Emulsion A.

TABLE 5

| Raw Materials | Recommended % wt. | Range of % wt. | Process |
|---|---|---|---|
| Water | 94.2 | 94-95 | Ambient temperature, any pH |
| Thickener | 0.3 | 0.2-0.4 | Start heating the mix, water, and thickener up to 120 F. while mixing until the thickener is fully dissolved in water |
| Emulsifier | 4.6 | 4.5-5.5 | Any emulsifier recommended for high molecular weight asphaltic products will be added to previous mix, while temperature is kept at 120 F. The speed of the mixer and mixing time will be adjusted in such manner that emulsifier has a chemical interaction with the thickener until the rheological modification occurs, confirmed by continuous wave contour without fixed points |
| Waterinsoluble compounds | 0.02 | 0.04 to 5.0 | Add while mixing, adjust mixer speed to make an emulsion, keep temperature at 120 F. |
| Base | 0.8 | 0.6-1.0 | Add base to obtain pH between 9-12 |

Physical properties associated with Anionic Second Phase Emulsion A are as shown in Table 6.

TABLE 6

| Test | Procedure | Recommended values |
|---|---|---|
| pH | ASTM | 10 |
| Saybolt viscosity, sec (optional) | AASTHO T 59 | Max 100 |
| Paddle Cannon viscosity, mPa · s | AASHTO T382 | Max 200 |
| Sieve, % | AASTHO T 59 | Max 0.3 |
| Storage stability 24 h, % | AASTHO T 59 | Max 0.1 |
| % residue by evaporation | AASTHO T 59 | Min 2.5 |

Example 4

Anionic Tack Coat

The phases shown in Table 7 below were combined to form an Anionic Tack Coat.

TABLE 7

| Phase | % wt. | Temperature range F. |
|---|---|---|
| Anionic Second Phase Emulsion A | 48 | 100-120 |
| Asphalt | 52 | 300-320 |

Physical properties associated with the Anionic Tack Coat are as shown in Table 8.

TABLE 8

| Property | Test Method | Recommended Ranges |
|---|---|---|
| TEST ON EMULSION | | |
| Saybolt viscosity, sec (optional) | AASTHO T 59 | Max 100 |
| PaddleCannon viscosity, mPa · s | AASHTO T382 | Max 200 |
| Sieve, % | AASTHO T 59 | Max 0.3 |
| Storage stability 24 h, % | AASTHO T 59 | Max 0.1 |
| % residue by evaporation | AASTHO T 59 | Min 50 |
| Particle charge section 8 | AASHTO 59 | Anionic |
| TEST ON RESIDUE | | |
| Pen on evaporation residue | AASHTO T 49 | 10-60 |

Example 5

Isoelectric Second Phase Emulsion A

The raw materials in Table 9 below were combined according to the process described in Table 9 to form Isoelectric Emulsion A.

TABLE 9

| Raw Materials | Recommended % wt. | Range of % wt. | Process |
|---|---|---|---|
| Water | 95.05 | 94-95 | Ambient temperature, any pH |
| Thickener | 0.3 | 0.2-0.4 | Start heating the mix, water, and thickener up to 120 F. while mixing until the thickener is fully dissolved in water |
| Emulsifier | 4.6 | 4.5-5.5 | Any emulsifier recommended for high molecular weight asphaltic products will be added to previous mix, while temperature is kept at 120 F. The speed of the mixer and mixing time will be adjusted in such manner that emulsifier has a chemical interaction with the thickener until the rheological modification occurs, confirmed by continuous wave contour without fixed points |
| Water insoluble compounds (optional) | 0.02 | 0.04 to 0.5 | Add while mixing, adjust mixer speed to make an emulsion, keep temperature at 120 F. |

Physical properties associated with Isoelectric Second Phase Emulsion A are as shown in Table 10.

TABLE 10

| Test | Procedure | Recommended values |
|---|---|---|
| pH | ASTM | 6-8 |
| Saybolt viscosity, sec (optional) | AASTHO T 59 | Max 100 |
| Paddle Cannon viscosity, mPa · s | AASHTO T382 | Max 200 |
| Sieve, % | AASTHO T 59 | Max 0.3 |
| Storage stability 24 h, % | AASTHO T 59 | Max 0.1 |
| % residue by evaporation | AASTHO T 59 | 2.5 |

Example 6

Isoelectric Second Phase B

The raw materials in Table 11 below were combined according to the process described in Table 11 to form Isoelectric Second Phase B.

TABLE 11

| Raw Materials | Recommended % wt. | Range of % wt. | Process |
|---|---|---|---|
| Water | 95 | 94-95 | Ambient temperature, any pH |
| Thickener | 0.4 | 0.2-0.4 | Start heating the mix, water, and thickener up to 120 F. while mixing until the thickener is fully dissolved in water |
| Emulsifier | 4.6 | 4.5-5.5 | Any emulsifier recommended for high molecular weight asphaltic products will be added to previous mix, while temperature is kept at 120 F. The speed of the mixer and mixing time will be adjusted in such manner that emulsifier has a chemical interaction with the thickener until the rheological modification occurs, confirmed by continuous wave contour without fixed points |

Physical properties associated with Isoelectric Second Phase B are as shown in Table 12.

TABLE 12

| Test | Procedure | Recommended values |
|---|---|---|
| pH | ASTM | 6-8 |
| % residue | ASTM D 7404 | 3 |

Example 7

Isoelectric Tack Coat

The phases in Table 13 below were combined to form an Isoelectric Tack Coat.

TABLE 13

| Phase | % wt. | Temperature range F. |
|---|---|---|
| Isoelectric Phase A or B | 48 | 100-120 |
| Asphalt | 52 | 300-320 |

Physical properties associated with the Isoelectric Tack Coat are as shown in Table 14.

TABLE 14

| Property | Test Method | Recommended Ranges |
|---|---|---|
| TEST ON EMULSION | | |
| Saybolt viscosity, sec (optional) | AASTHO T 59 | Max 100 |
| Paddle Cannon viscosity, mPa · s | AASHTO T382 | Max 200 |
| Sieve, % | AASTHO T 59 | Max 0.3 |
| Storage stability 24 h, % | AASTHO T 59 | Max 0.1 |
| % residue by evaporation | AASHTO T 59 | Min 50 |
| Isoelectric Point(PI) (optional) | ASTM D4187-82 | Report |
| Particle charge sect 8 | AASHTO T59 | anionic |
| Particle charge ID cationic sec 28 | AASHTO T59 | cationic |
| TEST ON RESIDUE | | |
| Pen on evaporation residue | AASHTO T 49 | 10-60 |

While the present invention has been described in terms of the above examples and detailed description, those of ordinary skill will understand that alterations may be made within the spirit of the invention. Accordingly, the above should not be considered limiting, and the scope of the invention is defined by the appended claims.

The invention claimed is:

1. A tack coat, comprising:
   (i) 40 wt. % to 60 wt. % of a first phase comprising asphalt; and
   (ii) 40 wt. % to 60 wt. % of a second phase, comprising: 80 wt. % to 98 wt. % water; 0.1 wt. % to 0.5 wt. % a rheology modifier; 1 wt. % to 10 wt. % an emulsifier; and 0.02 wt. % to 2 wt. % a material insoluble in the water, wherein the material insoluble in water comprises kerosene.

2. The tack coat of claim 1, wherein the second phase further comprises an acid and/or a base.

3. The tack coat of claim 1, wherein the second phase has a pH from 1-3.

4. The tack coat of claim 1, wherein the second phase has a pH from 9-13.

5. The tack coat of claim 1, wherein the second phase is anionic.

6. The tack coat of claim 1, wherein the second phase is cationic.

7. The tack coat of claim 1, wherein the second phase is isoelectric.

8. The tack coat of claim 1, wherein when applied to a surface and cured, the cured tack coat exhibits a pen rating from 10-60.

9. A tack coat, comprising:
   (i) 40 wt. % to 60 wt. % of a first phase comprising asphalt; and
   (ii) 40 wt. % to 60 wt. % of a second phase, comprising: 80 wt. % to 98 wt. % water; 0.1 wt. % to 0.5 wt. % a rheology modifier; 1 wt. % to 10 wt. % an emulsifier, wherein the emulsifier has an isoelectric point between a pH of 4.5-8; and 0.02 wt. % to 2 wt. % a material insoluble in the water, wherein the material insoluble in water comprises one or more of kerosene and naphthalene solvent.

10. The tack coat of claim 9, wherein the second phase further comprises an acid and/or a base.

11. The tack coat of claim 9, wherein the second phase has a pH from 1-3.

12. The tack coat of claim 9, wherein the second phase has a pH from 9-13.

13. The tack coat of claim 9, wherein the second phase is anionic.

14. The tack coat of claim 9, wherein the second phase is cationic.

15. The tack coat of claim 9, wherein the second phase is isoelectric.

16. The tack coat of claim 9, wherein when applied to a surface and cured, the cured tack coat exhibits a pen rating from 10-60.

* * * * *

UNITED STATES PATENT AND TRADEMARK OFFICE
CERTIFICATE OF CORRECTION

PATENT NO. : 11,708,508 B2
APPLICATION NO. : 16/819980
DATED : July 25, 2023
INVENTOR(S) : Ionela Glover et al.

Page 1 of 1

It is certified that error appears in the above-identified patent and that said Letters Patent is hereby corrected as shown below:

On the Title Page

Item (56), Column 2, Other Publications, Line 15, delete "FD-" and insert -- TD- --

Signed and Sealed this
Twenty-sixth Day of September, 2023

Katherine Kelly Vidal
*Director of the United States Patent and Trademark Office*